US010186730B2

(12) United States Patent
Omoda et al.

(10) Patent No.: US 10,186,730 B2
(45) Date of Patent: Jan. 22, 2019

(54) ELECTROLYTE SOLUTION FOR SECONDARY BATTERY AND SECONDARY BATTERY

(71) Applicant: Samsung Electronics Co., Ltd., Suwon-si, Gyeonggi-do (KR)

(72) Inventors: Ryo Omoda, Yokohama (JP); Yuichi Aihara, Yokohama (JP); Seitaro Ito, Yokohama (JP); Takanobu Yamada, Yokohama (JP)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 167 days.

(21) Appl. No.: 15/209,922

(22) Filed: Jul. 14, 2016

(65) Prior Publication Data

US 2017/0018802 A1 Jan. 19, 2017

(30) Foreign Application Priority Data

Jul. 15, 2015 (JP) ................................ 2015-141445
Jan. 11, 2016 (KR) ....................... 10-2016-0003338

(51) Int. Cl.

*H01M 10/0562* (2010.01)
*H01M 4/136* (2010.01)
*H01M 4/505* (2010.01)
*H01M 4/38* (2006.01)
*H01M 4/58* (2010.01)
*H01M 4/525* (2010.01)
*H01M 10/052* (2010.01)
*H01M 10/056* (2010.01)

(52) U.S. Cl.

CPC ....... *H01M 10/0562* (2013.01); *H01M 4/136* (2013.01); *H01M 4/382* (2013.01); *H01M 4/505* (2013.01); *H01M 4/525* (2013.01); *H01M 4/5815* (2013.01); *H01M 4/5825* (2013.01); *H01M 10/052* (2013.01); *H01M 10/056* (2013.01); *Y02T 10/7011* (2013.01)

(58) Field of Classification Search

CPC ........... H01M 10/0562; H01M 10/052; H01M 10/056; H01M 4/136; H01M 4/382; H01M 4/5815; H01M 4/5825; H01M 4/505; H01M 4/525

See application file for complete search history.

(56) References Cited

U.S. PATENT DOCUMENTS 5,508,129 A 4/1996 Barker
5,523,179 A 6/1996 Chu
5,532,077 A 7/1996 Chu
5,686,201 A 11/1997 Chu
5,789,108 A 8/1998 Chu
5,882,812 A 3/1999 Visco et al.
6,017,651 A 1/2000 Nimon et al.
6,030,720 A 2/2000 Chu et al.
6,358,643 B1 3/2002 Katz et al.
7,316,868 B2 1/2008 Gorkoevnko
7,354,680 B2 4/2008 Mikhaylik
7,553,590 B2 6/2009 Mikhaylik
7,785,730 B2 8/2010 Affinito et al.
7,842,421 B2 11/2010 Mikhaylik
8,173,302 B2 5/2012 Stamm et al.
8,338,034 B2 12/2012 Affinito et al.
8,597,838 B2 12/2013 Liang et al.
8,647,769 B2 2/2014 Kolosnitsyn et al.
8,663,840 B2 3/2014 Nazri et al.
8,735,002 B2 5/2014 Scordilis-Kelley et al.
8,828,610 B2 9/2014 Mikhaylik
8,871,391 B2 10/2014 Liang et al.
2005/0107239 A1 5/2005 Akiba et al.
2007/0072076 A1 3/2007 Kolosnitsyn et al.
2010/0239914 A1 9/2010 Mikhaylik et al.
2010/0291442 A1 11/2010 Wang et al.
2011/0006738 A1 1/2011 Mikhaylik et al.
2011/0052988 A1 3/2011 Liang et al.
2011/0076560 A1 3/2011 Scordilis-Kelley et al.
2011/0091773 A1 4/2011 Wei
2011/0262807 A1 10/2011 Boren et al.
2011/0287305 A1 11/2011 Scordilis-Kelley et al.
2012/0070746 A1 3/2012 Mikhaylik et al.
2013/0065128 A1 3/2013 Li et al.
2013/0136968 A1 5/2013 Glanz et al.
2013/0181677 A1 7/2013 Kourtakis et al.
2013/0183550 A1 7/2013 Kourtakis
2013/0202961 A1 8/2013 Hagen et al.
2013/0209880 A1 8/2013 Nozue et al.
2013/0330619 A1 12/2013 Archer et al.
2014/0023936 A1 1/2014 Belharouak et al.
2014/0052322 A1 2/2014 Takeshi
2014/0080009 A1 3/2014 Liang et al.
2014/0120428 A1 5/2014 Kolosnitsyn et al.
2015/0093652 A1* 4/2015 Aihara .............. H01M 10/0562 429/322

FOREIGN PATENT DOCUMENTS

JP 06-275313 A 4/1994
JP 2003208919 A 7/2003
JP 2005108531 A 4/2005
JP 2008-103096 * 5/2008
JP 2008103096 A 5/2008
JP 2009004133 A 1/2009
JP 2011082039 A 4/2011
JP 2012043646 A 3/2012

OTHER PUBLICATIONS

Holzwarth et al. Computer modeling of lithium phosphate and thiophosphate electrolyte materials Journal of Power Sources (2011), 196(16), pp. 6870-6876.*

(Continued)

*Primary Examiner* — Laura Weiner
(74) *Attorney, Agent, or Firm* — Cantor Colburn LLP

(57) ABSTRACT

An electrolyte for a secondary battery, the electrolyte including: an organic solvent; and a lithium ion conductive solid electrolyte represented by the formula $$Li_aP_bS_c$$

wherein 3<a<5, 1<b<3, and 6<c<8, and wherein at least a portion of the solid electrolyte is dissolved in the organic solvent.

20 Claims, 3 Drawing Sheets

(56) References Cited

FOREIGN PATENT DOCUMENTS

| | | | |
|---|---|---|---|
| JP | 2012099289 | A | 5/2012 |
| JP | 2013127982 | A | 6/2013 |
| WO | 2012070184 | A1 | 5/2012 |
| WO | 2013126864 | A1 | 8/2013 |
| WO | 2013191791 | A1 | 12/2013 |

OTHER PUBLICATIONS

Bruckner et al., "Lithium-sulfer batteries: Influence of C-rate, amount of electrolyte and sulfur loading on cycle performance", Journal of Power Sources, 268, 2014, pp. 82-87.

Diao et al., "Insights into Li-S Battery Chathode Capacity Fading Mechanisms: Irreversible Oxidation of Active Mass during Cycling", Journal of The Electrochemical Soeity, 159(11), 2012, A1816-A1821.

Lithium iron phosphate battery,[Retrieved from Internet dated Jul. 14, 2016] Lithium iron phosphate battery—Wikipedia,https://en.wikipedia.org/wiki/Lithium_ion_phosphate_battery.

* cited by examiner

ELECTROLYTE SOLUTION FOR SECONDARY BATTERY AND SECONDARY BATTERY

CROSS-REFERENCE TO RELATED APPLICATION

This application claims priority to and the benefit of Japanese Patent Application No. 2015-141445, filed on Jul. 15, 2015, in the Japanese Patent Office, and Korean Patent Application No. 10-2016-0003338, filed on Jan. 11, 2016, in the Korean Intellectual Property Office, and all the benefits accruing therefrom under 35 U.S.C. § 119, the contents of which are incorporated herein in their entirety by reference.

BACKGROUND

1. Field

The present disclosure relates to an electrolyte for a secondary battery and a secondary battery using the electrolyte solution.

2. Description of the Related Art

A lithium sulfur secondary battery has been suggested as the next generation high-capacity secondary battery. A theoretical capacity of a positive electrode active material of a lithium ion secondary battery is about 180 milliampere hours per gram (mAh/g). However, a theoretical capacity of a sulfur material is 1675 mAh/g.

However, there remains a need for an improved electrolyte.

SUMMARY

Provided is an electrolyte for a secondary battery, wherein the electrolyte provides improved electrochemical stability and improved battery performance, and at the same time allows the secondary battery to obtain sufficient lithium ion conductivity.

Provided is a secondary battery using the electrolyte solution.

Additional aspects will be set forth in part in the description which follows and, in part, will be apparent from the description, or may be learned by practice of the presented embodiments.

Among sulfide-based solid electrolytes having lithium ion conductivity, disclosed is an electrolyte which is soluble in an organic solvent.

Also disclosed is an organic electrolyte solution of the sulfide-based solid electrolyte and its use in a secondary battery.

According to an aspect of an embodiment, an electrolyte for a secondary battery includes: an organic solvent; and a lithium ion conductive solid electrolyte represented by the formula $Li_aP_bS_c$ wherein, $3<a<5$, $1<b<3$, and $6<c<8$, and wherein at least a portion of the solid electrolyte is dissolved in the organic solvent.

An inorganic solid electrolyte having lithium ion conductivity can be used as an electrolyte layer of an all-solid lithium secondary battery. The inorganic solid electrolyte can provide high thermal-resistance and high electrochemical stability as well as a high conductivity for lithium ions in a solid state. Also, available solid electrolytes having lithium ion conductivity do not dissolve in an organic solvent.

Disclosed is a solid electrolyte having lithium ion conductivity that has sufficient solubility in an organic solvent. Also, it was found that an organic solution prepared by dissolving the solid electrolyte having lithium ion conductivity in an organic solvent has a lithium ion conductivity equal to that of an electrolyte including a lithium salt.

The disclosed electrolyte for a secondary battery may provide improved electrochemical stability and have sufficient lithium ion conductivity and may allow for improved battery performance.

According to an aspect of another embodiment, a solid electrolyte having lithium ion conductivity is represented by the formula $Li_aP_bS_c$, wherein, $3<a<5$, $1<b<3$, and $6<c<8$. Also, at least a portion of the solid electrolyte having lithium ion conductivity can have a composition of the formula $Li_4P_2S_7$. In this regard, sufficient solubility may be obtained due to the organic solvent, and thus the battery performance may improve.

In some embodiments, a lithium ion conductivity may be $1\times10^{-6}$ S/cm or higher. In this regard, the battery performance may improve.

In some embodiments, the electrolyte solution for a secondary battery may be in the form of gel. In this regard, the handling property may improve.

According to an aspect of another embodiment, a secondary battery includes: a negative electrode including a material capable of intercalating and deintercalating lithium ions; a positive electrode including a positive electrode active material; a separator disposed between the negative electrode and the positive electrode; and an electrolyte disposed between the negative electrode and the positive electrode, wherein the electrolyte includes an organic solvent, and a lithium ion conductive solid electrolyte represented by the formula $$Li_aP_bS_c$$

wherein $3<a<5$, $1<b<3$, and $6<c<8$, and wherein at least a portion of the solid electrolyte is dissolved in the organic solvent. In this regard, the secondary battery may have excellent battery performance.

In some embodiments, the organic solvent may be tetrahydrofuran (THF). In this regard, the solid electrolyte having lithium ion conductivity may have sufficient solubility.

In some embodiments, the electrolyte solution for a secondary battery may include an additive. In this regard, the battery performance may be effectively improved.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
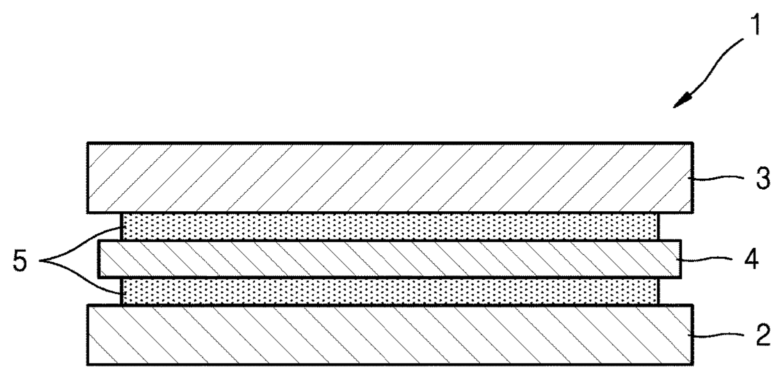
FIG. 1 is a cross-sectional view schematically illustrating a structure of a lithium secondary battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Features of Lithium Sulfur Secondary Battery

As shown in FIG. 1, a secondary battery according to an embodiment may be a lithium sulfur secondary battery 1. For example, the lithium sulfur secondary battery 1 includes a positive electrode 2 including sulfur as a positive electrode active material; a negative electrode 3 that includes a material capable of depositing and stripping, e.g., intercalating and deintercalating, lithium ions; a separator 4 that is between the positive electrode 2 and the negative electrode 3; and an electrolyte solution 5 that is disposed between, e.g., fills a space between, the positive electrode 2 and the negative electrode 3 and has suitable lithium ion conductivity.

For example, the positive electrode 2 may be formed by preparing a positive electrode material in the form of paste prepared by adding an appropriate solvent to a mixture including a positive electrode active material, a conducting agent, and a binder; coating and drying the positive electrode material on a surface of a current collector; and pressing the resultant to increase an electrode density if desired. The positive electrode active material may be a sulfur containing positive electrode active material for a lithium sulfur secondary battery. Sulfur may be included in any suitable form and may be at least one of elemental sulfur and a metal sulfide. Also, the metal sulfide may include a metal polysulfide. When the elemental sulfur is used as a positive electrode active material, at least a portion of the sulfur may be modified with an organic component, including a surface treating agent such as a surfactant, a polymer-based pigment, or a silicon resin to improve dispersibility of sulfur in the positive electrode active material. Here, a concentration of the organic component in the modified sulfur may be in a range of about 0.01 weight percent (wt %) to about 10 wt %, or about 0.1 wt % to about 5 wt %, based on a total weight of the positive electrode active material.

The negative electrode 3 may be, for example, a negative electrode for a lithium ion secondary battery or a lithium sulfur secondary battery. In particular, a material for the negative electrode 3 may comprise Li; an alloy of Li and Al or In; or Si, SiO, Sn, or $SnO_2$ doped with lithium ions; or a carbonaceous material. However, the material for the negative electrode 3 is not limited thereto and any suitable material, including those available as a negative electrode in the art, may be used.

The separator 4 may be a separator for a lithium ion secondary battery or a lithium sulfur secondary battery, and may be placed in the electrolyte solution 5 and insulate between the positive electrode 2 and the negative electrode 3. For example, the separator 4 may be a porous layer formed of a synthetic resin material such as polytetrafluoroethylene (PTFE), polypropylene (PP), or polyethylene (PE); or a porous layer formed of a ceramic material, or may have a structure prepared by stacking at least two porous layers selected therefrom. Among the porous layers, when a porous layer formed of a polyolefin material is used, a safety of the battery may be improved due to a shutdown effect (an effect of cutting a current by closing pores when an excessive current flows) as well as by providing an electric short preventing effect of the porous layer formed of a polyolefin material.

As shown in FIG. 1, the electrolyte solution 5 is disposed between the positive electrode 2 and the separator 4, inside the separator 4, and in a space between the separator 4 and the negative electrode 3, and at least a part of the solid electrolyte having lithium ion conductivity is dissolved in the organic solvent.

The solid electrolyte having lithium ion conductivity is represented by the formula $Li_aP_bS_c$. In the formula $Li_aP_bS_c$, a, b, and c satisfy $3<a<5$, $1<b<3$, and $6<c<8$. For example, a, b, and c can satisfy $3.3<a<4.7$, $1.3<b<2.7$, and $6.3<c<7.7$. For example, a, b, and c satisfy $3.5<a<4.5$, $1.5<b<2.5$, and $6.5<c<7.5$. For example, a, b, and c satisfy $3.7<a<4.3$, $1.7<b<2.3$, and $6.7<c<7.3$. Also, at least part of the solid electrolyte having lithium ion conductivity may have a composition of the formula $Li_4P_2S_7$.

Examples of the organic solvent may be at least one selected from an ether-based organic solvent such as tetrahydrofuran, glyme, diglyme, triglyme, or tetraglyme; and an ester-based solvent such as diethyl carbonate or propylene carbonate, or a mixture of at least one selected therefrom and dioxolane. If desired, dioxolane can be included to control a viscosity, but the examples of the organic solvent are not limited thereto, and any suitable organic solvent capable of dissolving a solid electrolyte, including those available in the art, may be used. In particular, the organic solvent may be tetrahydrofuran.

A concentration of a solid electrolyte in the electrolyte solution 5 may be, for example, about 0.005 molar (M) or greater, for example, about 0.01 M or greater, for example, about 0.03 M or greater, for example, about 0.05 M or greater, for example, about 0.08 M or greater, for example, about 0.1 M, or, for example, about 0.3 M, in terms of improving battery performance. A concentration of a solid electrolyte in the electrolyte solution 5 may be, for example, about 0.005 M to 10 M, for example, about 0.005 M to 5 M, for example, about 0.005 M to 3 M, for example, about 0.005 M to 1 M.

Also, the lithium ion conductivity of the electrolyte solution 5 may be, for example, about $1\times10^{-7}$ Siemens per centimeter (S/cm) or greater, for example, about $5\times10^{-7}$ S/cm or greater, for example, about $1\times10^{-6}$ S/cm or greater, for example, about $5\times10^{-6}$ S/cm or greater, for example, about $1\times10^{-5}$ S/cm or greater, or, for example, about $5\times10^{-5}$ S/cm or greater, in terms of improving battery performance. The lithium ion conductivity of the electrolyte solution 5 may be, for example, about $1\times10^{-7}$ S/cm to about $1\times10^{-2}$ S/cm, or about $1\times10^{-6}$ S/cm to about $1\times10^{-3}$ S/cm.

Also, a resistance value of the electrolyte solution 5 may be, for example, 34000 ohms (Ω) or less, for example, 30000Ω or less, for example, 20000Ω or less, for example, 10000Ω or less, for example, 5000Ω or less, or, for example, 2000Ω or less, such as 34000Ω to 500Ω, in terms of improving battery performance.

Also, the electrolyte solution 5 may be in a liquid phase or may be in a gel phase including a polymer. Examples of the polymer in the electrolyte solution 5 in a gel phase may include polyethylene oxide (PEO), polyacrylonitril (PAN), polyvinylidene fluoride (PVDF), and polymethylmethacrylate (PMMA), but the examples of the polymer are not limited thereto, and any suitable material available as a polymer capable of forming a gel phase in the art may be used.

Also, the electrolyte solution 5 may include an additional additive to improve charging/discharging characteristics or safety of the secondary battery. Examples of the additive may include an additive such as $LiNO_3$, which, while not wanting to be bound by theory, it is understood to form a coating layer on a metal lithium negative electrode surface to prevent shuttle phenomenon; or an inorganic-based additive such as an alkali metal salt, an alkaline earth metal salt, or an ammonium salt, which includes at least one halide ion selected from, for example, a fluoride ion ($F^-$), a chloride ion ($Cl^-$), a bromide ion ($Br^-$), and an iodide ion ($I^-$) to form a coating layer, improve safety, and improve durability. However, the examples of the additive are not limited thereto, and any suitable inorganic additive available as an additive in an electrolyte solution in the art may be used. Also, the examples of the additive may include an organic-based additive having the same purpose of forming a coating layer, improving safety, and improving durability. The additive may be used alone or as a combination thereof. A concentration of the additive may be, for example, about 0.01 wt % or greater, for example, about 0.05 wt % or greater, or, for example, about 0.1 wt % or greater, or about 0.01 wt % to about 5 wt %, or about 0.1 wt % to about 1 wt %, based on a total weight of the electrolyte.

An electrochemical potential window of the electrolyte solution 5 may be in a range of, for example, about 0 volts (V) to about 3.35 V, for example, about 0 V to about 3.3 V, for example, about 0 V to about 3.25 V, for example, about 0 V to about 3.2 V, for example, about 0 V to about 3.15 V, or, for example, about 0 V to about 3.1 V, or about 0.1 V to about 3.35 V, or about 0.2 V to about 3.25 V, with respect to a lithium metal (Li/Li+). Therefore, when the electrolyte solution having such wide electrochemical potential window is used, a lithium sulfur secondary battery may be stable. For example, when the solvent is gamma-butyrolactone, the electrochemical potential window of the electrolyte solution 5 may be in a range of about 0 V to about 3.4 V with respect to a lithium metal. For example, when the solvent is tetrahydrofuran (THF), the electrochemical potential window of the electrolyte solution 5 may be in a range of about 0 V to about 3.1 V with respect to a lithium metal.

The electrolyte solution 5 may have a high electrochemical stability as well as having sufficient lithium ion conductivity. Thus, when the electrolyte solution 5 is used, a lithium sulfur secondary battery may have excellent battery performance.

Operating Mechanism of Lithium Sulfur Secondary Battery

While not wanting to be bound by theory, it is understood that the lithium sulfur secondary battery 1 having the features described above operates by the following mechanism when the negative electrode 3 is formed of a metal lithium. That is, during a discharging process, the metal lithium of the negative electrode 3 is oxidized as represented by Reaction Scheme 1, and thus $Li^+$ is released into the electrolyte solution 5.

Reaction Scheme 1

$$Li \rightarrow Li^+ + e^- \quad (1)$$

The released $Li^+$ moves to a side of the positive electrode 2 via the separator 4 by a reduction reaction that is represented by Reaction Scheme 2 and reacts with a sulfur active material such as $S_8$ of the positive electrode 2, and thus a discharge product, $Li_2S$, is produced. Also, a current may be emitted to the outside of the lithium sulfur secondary battery 2.

Reaction Scheme 2

$$16Li^+ + S_8 + 16e^- \rightarrow 8Li_2S \quad (2)$$

During a charging process, a discharge product, $Li_2S$, with respect to the positive electrode 2 is oxidized by a reverse reaction of Reaction Scheme 2, and thus $Li^+$ is released into the electrolyte solution 5. $Li^+$ moves to the negative electrode 3 via the separator 4, and thus $Li^+$ is reduced by a reverse reaction of Reaction Scheme 1 at a negative electrode interface.

Features of Lithium Ion Secondary Battery

As shown in FIG. 1, a secondary battery according to an embodiment may be a lithium ion secondary battery 1. For example, the lithium ion secondary battery 1 includes a positive electrode 2 that includes a lithium metal oxide as a positive electrode active material; a negative electrode 3 that includes a material capable of intercalating or deintercalating lithium ions; a separator 4 that is between the positive electrode 2 and the negative electrode 3; and an electrolyte solution 5 that is disposed between the positive electrode 2 and the negative electrode 3 and has ion conductivity. The electrolyte solution 5 is an electrolyte solution, in which a solid electrolyte having lithium ion conductivity is dissolved.

The lithium ion secondary battery 1 may be prepared as follows.

First, a negative electrode is prepared. For example, a negative electrode active material, a conducting agent, a binder, and a solvent are mixed to prepare a negative electrode active material composition. In some embodiments, the negative electrode active material composition may be directly coated on a metallic current collector to prepare a negative electrode plate. In some embodiments, the negative electrode active material composition may be cast on a separate support to form a negative electrode active material film, which may then be separated from the support and laminated on a metallic current collector to prepare a negative electrode plate. The negative electrode is not limited to the examples described above, and may be one of various types.

The negative electrode active material may be a non-carbonaceous material. For example, the negative electrode active material may be at least one selected from a lithium metal, a metal alloyable with lithium, an alloy of a metal alloyable with lithium, and an oxide of a metal alloyable with lithium.

Examples of the metal alloyable with lithium may include Si, Sn, Al, Ge, Pb, Bi, Sb, a Si—Y' alloy (where, Y' is an alkali metal, an alkaline earth metal, a Group 13 element, a Group 14 element, a Group 15 element, a Group 16 element, a transition metal, a rare earth element, or a combination thereof, and Y' is not Si), and a Sn—Y' alloy (where, Y' is an alkali metal, an alkaline earth metal, a Group 13 element, a Group 14 element, a Group 15 element, a Group 16 element, a transition metal, a rare earth element, or a combination thereof, and Y' is not Sn). In some embodiments, Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

Examples of the transition metal oxide may include a lithium titanium oxide, a vanadium oxide, and a lithium vanadium oxide.

Examples of the non-transition metal oxide may include $SnO_2$ and $SiO_x$ (where, $0<x<2$).

In particular, the negative electrode active material may be at least one selected from Si, Sn, Pb, Ge, Al, $SiO_x$ (where, $0<x\leq2$), $SnO_y$ (where, $0<y\leq2$), $Li_4Ti_5O_{12}$, $TiO_2$, $LiTiO_3$, and $Li_2Ti_3O_7$, but is not limited thereto, and any suitable material available as a non-carbonaceous negative electrode active material in the art may be used.

Also, a composite of the non-carbonaceous negative electrode active material and a carbonaceous material may be used and may further include a carbonaceous negative electrode active material in addition to the non-carbonaceous material.

Examples of the carbonaceous material may include crystalline carbon, amorphous carbon, and mixtures thereof. Examples of the crystalline carbon are graphite, such as natural graphite or artificial graphite in shapeless, plate, flake, spherical, or fibrous form. Examples of the amorphous carbon are soft carbon (carbon sintered at low temperatures), hard carbon, meso-phase pitch carbides, and sintered cokes.

In particular, the negative electrode active material may be a lithium metal.

Examples of the conducting agent include acetylene black, Ketjen black, natural graphite, artificial graphite, carbon black, carbon fibers, and a metal powder or metal fibers of copper, nickel, aluminum, or silver. In some embodiments, the conducting agent may be a polyphenylene derivative alone or a mixture of a polyphenylene derivative and at least one selected from the examples of the conducting agent, but the conducting agent is not limited thereto, and any suitable material available as a conducting agent in the art may be used. Also, the crystalline carbonaceous material may be used as a conducting agent.

Examples of the binder may include a vinylidene fluoride/hexafluoropropylene copolymer, PVDF, polyacrylonitrile, PMMA, polytetrafluoroethylene, mixtures thereof, and a styrene butadiene rubber polymer, but embodiments are not limited thereto. Any suitable material available as a binding agent in the art may be used.

Examples of the solvent may include N-methyl-pyrrolidone, acetone, and water, but embodiments are not limited thereto. Any suitable material available as a solvent in the art may be used.

The amounts of the negative electrode active material, the conducting agent, the binder, and the solvent may be in ranges that are used in lithium batteries, the details of which can be by one of skill in the art without undue experimentation. At least one of the conducting agent, the binder, and the solvent may be omitted according to the use and the structure of the lithium battery.

Next, a positive electrode is prepared.

For example, a positive electrode active material, a conducting agent, a binder, and a solvent are mixed to prepare a positive electrode active material composition. In some embodiments, the positive electrode active material composition may be directly coated on a metallic current collector and dried to prepare a positive electrode plate. In some embodiments, the positive electrode active material composition may be cast on a separate support to form a positive electrode active material film, which may then be separated from the support and laminated on a metallic current collector to prepare a positive electrode plate.

The positive electrode active material may be any suitable lithium metal oxide that allows an electrolyte solution including a lithium ion conductive solid electrolyte to operate within an electrochemically stable voltage range and may be used as a positive electrode active material of a lithium ion secondary battery.

Examples of the positive electrode active material may include at least one selected from a lithium cobalt oxide, a lithium nickel cobalt manganese oxide, a lithium nickel cobalt aluminum oxide, a lithium iron phosphate, and a lithium manganese oxide, but the examples of the positive electrode active material are not limited thereto, and any suitable material available as a positive electrode active material in the art may be used.

In some embodiments, the positive electrode active material may be a compound represented by one of the following formulae:

$Li_aA_{1-b}B'_bD_2$ (where, $0.90 \le a \le 1.8$ and $0 \le b \le 0.5$); $Li_aE_{1-b}B'_bO_{2-c}D_c$ (where, $0.90 \le a \le 1.8$, $0 \le b \le 0.5$, and $0 \le c \le 0.05$); $LiE_{2-b}B'_bO_{4-c}D_c$ (where, $0 \le b \le 0.5$ and $0 \le c \le 0.05$); $Li_aNi_{1-b-c}Co_bB'_cD_\alpha$ (where, $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F'_\alpha$ (where, $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_2$ (where, $0.90 \le a \le 1.8$, $0 \le b \le 0.5$, $0 \le c \le 0.05$, and $0 < \alpha < 2$); $Li_aNi_{1-b-c}Mn_bB'_cD_\alpha$ (where, $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F'_\alpha$ (where, $0.90 \le a \le 1.8$, $0 \le b \le 0.5$, $0 \le c \le 0.05$, and $0 < \alpha < 2$); $Li_aNi_{1-b-c}Mn_bB'_cO_{2-a}F'_2$ (where, $0.90 \le a \le 1.8$, $0 \le b \le 0.5$, $0 \le c \le 0.05$, and $0 < \alpha < 2$); $Li_aNi_bE_cG_dO_2$ (where, $0.90 \le a \le 1.8$, $0 \le b \le 0.9$, $0 \le c \le 0.5$, and $0.001 \le d \le 0.1$); $Li_aNi_bCo_cMn_dGeO_2$ (where, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1.8$, and $0.001 \le b \le 0.1$); $Li_aCoG_bO_2$ (where, $0.90 \le a \le 1.8$ and $0.001 \le b \le 0.1$); $Li_aMnG_bO_2$ (where, $0.90 \le a \le 1.8$ and $0.001 \le b \le 0.1$); $Li_aMn_2G_bO_4$ (where, $0.90 \le a \le 1.8$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where, $0 \le f \le 2$); $Li_{(3-f)}Fe_2(PO_4)_3$ (where, $0 \le f \le 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q may be selected from titanium (Ti), molybdenum (Mo), manganese (Mn), and combinations thereof; I' may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

The compounds listed above as positive electrode active materials may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include at least one compound of a coating element compound selected from oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may comprise magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any suitable method that does not adversely affect the physical properties of the positive electrode active material when a compound of the coating element is used. For example, the coating layer may be formed using a spray coating method, or a dipping method. The coating methods may be well understood by one of ordinary skill in the art, and thus a detailed description thereof will be omitted.

An operation potential of the lithium ion secondary battery may be, for example, about 3.4 V or less with respect to a lithium metal. For example, an operation potential of the lithium ion secondary battery may be in a range of about 0 V to about 3.35 V with respect to a lithium metal. For example, an operation potential of the lithium ion secondary battery may be in a range of about 0 V to about 3.3 V with respect to a lithium metal. For example, an operation potential of the lithium ion secondary battery may be in a range of about 0 V to about 3.25 V with respect to a lithium metal. For example, an operation potential of the lithium ion secondary battery may be in a range of about 0 V to about 3.2 V with respect to a lithium metal. For example, an operation potential of the lithium ion secondary battery may be in a range of about 0 V to about 3.1 V with respect to a lithium metal. When the operation potential of the lithium ion secondary battery is within these ranges, side reactions of the electrolyte solution are suppressed, and thus the lithium ion secondary battery may operate stably.

In the lithium ion secondary battery, the positive electrode may include a sulfide such as $MoS_2$, $TiS_2$, or $FeS_2$; or an oxide such as $V_2O_5$ or $MnO_2$ as a positive electrode active material.

In the lithium ion secondary battery, the positive electrode may include an olivine-based positive electrode active material. Since the operation potential of the lithium ion secondary battery including the olivine-based positive electrode active material is about 3.2 V with respect to a lithium metal, side reactions of the electrolyte solution may be suppressed.

For example, the olivine-based positive electrode active material may be a compound represented by Formula 1:

$$Li_xMe_yM_zPO_{4-d}X_d \qquad \text{Formula 1}$$

In Formula 1, $0.9 \leq x \leq 1.1$, $0.9 \leq y \leq 1.1$, $0 \leq z \leq 0.2$, and $0 \leq d \leq 0.2$;

Me is at least one selected from Fe, Mn, Ni, and Co;

M is at least one selected from Mg, Ca, Sr, Ba, Ti, Zr, Nb, Mo, W, Zn, Al, and Si; and X is at least one selected from S and F.

For example, the olivine-based positive electrode active material may be at least one selected from $LiFePO_4$, $LiFe_{1-a}Mn_aPO_4$ (where, $0<a<1$), and $LiMnPO_4$.

In the positive electrode active material composition, the conducting agent, the binder, and the solvent used for the positive electrode active material composition may be the same as those used for the negative electrode active material composition.

In the positive electrode active material composition, the conducting material, the binder, and the solvent may be the same as those used in preparation of the positive electrode active material composition. In some embodiments, a plasticizer may be further added to the positive electrode active material composition and/or the negative electrode active material composition to form pores in the electrode plate.

The amounts of the positive electrode active material, the conducting agent, the binder, and the solvent may be in ranges that are used in lithium batteries. At least one of the conducting agent, the binder, and the solvent may be omitted according to the use and the structure of the lithium battery.

Next, a separator to be disposed between the positive electrode and the negative electrode is prepared. The separator for the lithium battery may be any suitable separator for a lithium battery. In some embodiments, the separator may have low resistance to migration of ions in an electrolyte and have an excellent electrolyte-retaining ability. Examples of the separator are glass fiber, polyester, Teflon, polyethylene, polypropylene, PTFE, and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer resin used to manufacture the separator may be any suitable material for a binder for electrode plates. Examples of the polymer resin may include a vinylidenefluoride/hexafluoropropylene copolymer, PVDF, polyacrylonitrile, PMMA, and a mixture thereof.

Then, an electrolyte is prepared.

In some embodiments, the electrolyte solution may be the same as that used for the lithium sulfur secondary battery.

In some embodiments, the electrolyte solution may be prepared by dissolving a lithium ion conductive solid electrolyte in an organic solvent that is used to prepare an electrolyte solution of a lithium ion secondary battery.

Examples of the organic solvent that is used to prepare an electrolyte solution of a conventional lithium ion secondary battery may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N, N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, or a mixture thereof In some embodiments, the electrolyte solution may further include a lithium salt, which is any suitable material available as a lithium salt in the art, in addition to the lithium ion conductive solid electrolyte. In some embodiments, examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, x and y are each independently a natural number), LiCl, LiI, or a mixture thereof.

Referring to FIG. 1, a lithium ion secondary battery 1 includes a positive electrode 2, a negative electrode 3, and a separator 4. In some embodiments, the positive electrode 2, the negative electrode 3, and the separator 4 may be wound or folded, and then sealed in a battery case (not shown). In some embodiments, the battery case (not shown) may be filled with an organic electrolytic solution 5 and sealed with a cap assembly (not shown), thereby completing the manufacture of the lithium ion secondary battery 1. In some embodiments, the battery case (not shown) may be a cylindrical type, a rectangular type, or a thin-film type. For example, the lithium ion secondary battery 1 may be a thin-film type battery.

In some embodiments, the lithium ion secondary battery 1 may be a lithium ion polymer battery. In some embodiments, the separator 4 may be disposed between the positive electrode 2 and the negative electrode 3 to form a battery assembly, the battery assembly may be stacked in a bi-cell structure, or rolled and impregnated with the electrolytic solution, and the resultant assembly may be put into a pouch and hermetically sealed, thereby completing the manufacture of the lithium ion polymer battery.

In some embodiments, a plurality of battery assemblies may be stacked to form a battery pack, which may be used in any device that requires high capacity and high output, for example, in a laptop computer, a smart phone, or an electric vehicle.

The lithium battery may have excellent thermal stability and improved battery characteristics, and thus may be used in an electric vehicle (EV), for example, in a hybrid vehicle such as a plug-in hybrid electric vehicle (PHEV).

Features of Lithium Air Secondary Battery

As shown in FIG. 1, the secondary battery according to an embodiment may be a lithium air secondary battery 1. For example, the lithium air secondary battery 1 includes a positive electrode 2 that uses air as a positive electrode active material; a negative electrode 3 that includes a material capable of intercalating and deintercalating lithium ions; a separator 4 that is between the positive electrode 2 and the negative electrode 3; and an electrolyte solution 5 that fills a space between the positive electrode 2 and the negative electrode 3 and has lithium ion conductivity. The electrolyte solution 5 is an electrolyte solution in which a solid electrolyte having lithium ion conductivity is dissolved.

In some embodiments, the lithium air secondary battery 1 may be prepared as follows.

First, an air electrode is prepared as the positive electrode 2. For example, the air electrode may be prepared as follows. A conducting material, as an electrode member, and a binder may be mixed together, followed by adding an appropriate solvent thereto, or may be mixed without adding a solvent thereto to prepare an air electrode slurry, and then the air electrode slurry may be coated and dried on a surface of a current collector; and, optionally, the resultant may be press-molded with the current collector to increase an electrode density. The current collector may be a gas diffusion layer. Alternatively, the air electrode slurry may be coated and dried on a surface of a separator or a solid electrolyte layer, and, optionally, the resultant may be press-molded with the separator or the solid electrolyte layer to increase an electrode density.

The conducting material included in the air electrode slurry may be porous. Thus, any suitable material having suitable porosity and suitable conductivity may be used as the conducting material. For example, a carbonaceous material having suitable porosity may be used as the conducting material. Examples of the carbonaceous material may include carbon black, graphite, graphene, activated carbon, or carbon fibers.

The air electrode slurry may include a catalyst for oxidation/reduction of oxygen, and examples of the catalyst may include a noble metal-based catalyst such as platinum, gold, silver, palladium, ruthenium, rhodium, or osmium; an oxide-based catalyst such as a manganese oxide, an iron oxide, a cobalt oxide, or a nickel oxide; or an organic metal-based catalyst such as cobalt phthalocyanine, but the examples of the catalyst are not limited thereto, and any suitable material available as an oxidation/reduction catalyst of oxygen in the art may be used.

Also, the catalyst may be contained in a carrier. The carrier may be an oxide, a zeolite, a clay mineral, or carbon. The oxide may include at least one oxide selected from alumina, silica, zirconium oxide, and titanium oxide. The oxide may include at least one metal selected from cesium (Ce), praseodymium (Pr), samarium (Sm), europium (Eu), terbium (Tb), thulium (Tm), ytterbium (Yb), stibium (antimony. Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon may include carbon black such as Ketjen black, acetylene black, channel black, or lamp black; graphite such as natural graphite, artificial graphite, or expanded graphite; activated carbon or carbon fibers, but the examples of the carbon are not limited thereto, and any suitable material available as a carrier in the art may be used.

The air electrode slurry may further include a binder. The binder may include a thermoplastic resin or a thermosetting resin. For example, polyethylene, polypropylene, poly tetrafluoroethylene (PTFE), PVDF, styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, or an ethylene-acrylic acid copolymer may be used alone or as a mixture thereof, but the binder is not limited thereto, and any suitable material available as a binder in the art may be used.

The current collector may be a porous material in the shape of a net or mesh, or a porous metal plate such as stainless steel, nickel, or aluminum for rapid oxygen dispersion. However, the current collector is not limited thereto, and any suitable current collector available in the art may be used. The current collector may be coated with an oxidization-resistance metal or an alloy coating film to prevent its oxidation.

The air electrode slurry may optionally include an oxygen oxidation/reduction catalyst and a conducting material. Also, the air electrode slurry may, optionally, include a lithium oxide.

Next, a negative electrode is prepared.

In preparation of the negative electrode, a negative electrode active material included in the negative electrode of the lithium ion secondary battery and a method of preparing the negative electrode of the lithium ion secondary battery may be used.

In particular, the negative electrode may be a lithium metal.

Next, a separator is disposed between the air electrode and the negative electrode.

The separator may be a separator used in the lithium ion secondary battery.

Also, instead of a separator or in addition to a polymer separator, an oxygen blocking layer, which is impervious to oxygen, may be additionally disposed between the air electrode and a protection negative electrode. The oxygen blocking layer is a lithium ion conductive solid electrolyte layer, which may serve as a protection layer that blocks direct reaction between impurities such as oxygen included in the air electrode and a lithium metal negative electrode. In this regard, examples of the lithium ion conductive solid electrolyte layer impervious to oxygen may include an inorganic material, for example, lithium ion conductive glass, lithium ion conductive crystal (ceramic or glass-ceramic), or a mixture thereof. However, the examples of the lithium ion conductive solid electrolyte layer are not limited thereto, and any suitable material that has lithium ion conductivity, is sufficiently impervious to oxygen, and available as a solid electrolyte layer that may protect a negative electrode may be used. In consideration of chemical stability, an example of the lithium ion conductive solid electrolyte layer may be an oxide.

For example, the oxygen blocking layer including lithium ion conductive crystal includes $Li_{1+x+y}Al_x(Ti,Ge)_{2-x}Si_yP_{3-y}O_1$. 0–x–2, 0–y–3), and an example of the oxygen blocking layer may be a solid electrolyte layer including LATP ($Li_{1.4}Ti_{1.6}Al_{0.4}P_3O_{12}$).

Next, an electrolyte solution is injected between the air electrode and the negative electrode.

The electrolyte solution may be same as that used in a lithium sulfur secondary ion battery or a lithium ion secondary battery. The separator and the positive electrode (the air electrode) may be impregnated with the electrolyte solution.

In the lithium air secondary battery, an operation potential of the lithium air secondary battery may be about 3.4 V with respect to a lithium metal. For example, an operation potential of the lithium air secondary battery may be in a range of about 0 V to about 3.4 V with respect to a lithium metal. For example, an operation potential of the lithium air secondary battery may be in a range of about 0 V to about 3.3 V with respect to a lithium metal. For example, an operation potential of the lithium air secondary battery may be in a range of about 0 V to about 3.2 V with respect to a lithium metal. For example, an operation potential of the lithium air secondary battery may be in a range of about 0 V to about 3.1 V with respect to a lithium metal. When the operation potential of the lithium air secondary battery is within these ranges, side reactions of the electrolyte solution are suppressed, and thus the lithium air secondary battery may operate stably.

For example, referring to FIG. 1, the lithium air secondary battery 1 includes the air electrode 2, the negative electrode 3, and the separator 4. The air electrode 2, the negative electrode 3, and the separator 4 are accommodated in the battery case (not shown). Subsequently, the electrolyte solution 5 is disposed in, e.g., injected into, the battery case (not shown) and sealed with a cap assembly (not shown), thereby completing the manufacture of the lithium air secondary battery 1. In some embodiments, the battery case may be a cylindrical type, a rectangular type, or a thin-film type. For example, the lithium air secondary battery 1 may be a thin-film type battery.

A shape of the lithium air secondary battery is not particularly limited, and examples of the shape may include a coin-shape, a button-shape, a sheet-shape, a stack-shape, a cylinder-shape, a panel-shape, or a cone-shape. Also, the lithium air secondary battery may be used in a large-size battery for electrical vehicles.

As used herein, the term "air" is not limited to atmospheric air, and refers to either a gas combination including oxygen or a pure oxygen gas. The broad definition of the term "air" may be applied to all kinds of applications including an air battery or an air electrode.

Operation Mechanism of Lithium Air Secondary Battery

The lithium air secondary battery may include an electrolyte comprising a solid electrolyte having lithium ion conductivity. A portion of the solid electrolyte may be dissolved in an organic solvent of the electrolyte. In this case, and while not wanting to be bound by theory, a reaction mechanism of the lithium air secondary battery may be represented by Reaction Scheme 1.

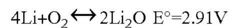

$4Li+O_2 \leftrightarrow 2Li_2O$ E°=2.91V

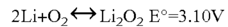

$2Li+O_2 \leftrightarrow Li_2O_2$ E°=3.10V Reaction Scheme 1

During discharge, lithium generated from the negative electrode reacts with oxygen gas entering the battery via the positive electrode, and thus lithium oxide is produced, and the oxygen is reduced (oxygen reduction reaction: ORR). Conversely, during charge, a lithium oxide is reduced, the oxygen is oxidized, and oxygen gas evolves (oxygen evolution reaction: OER). During the discharge, $Li_2O_2$ is precipitated in pores of the positive electrode, a capacity of a lithium air secondary battery increases as an area of the electrolyte in contact with oxygen in the positive electrode increases.

EXAMPLES

Next, examples of an embodiment will be disclosed in further detail.

Example 1

Preparation of $Li_4P_2S_7$

Figure 2:
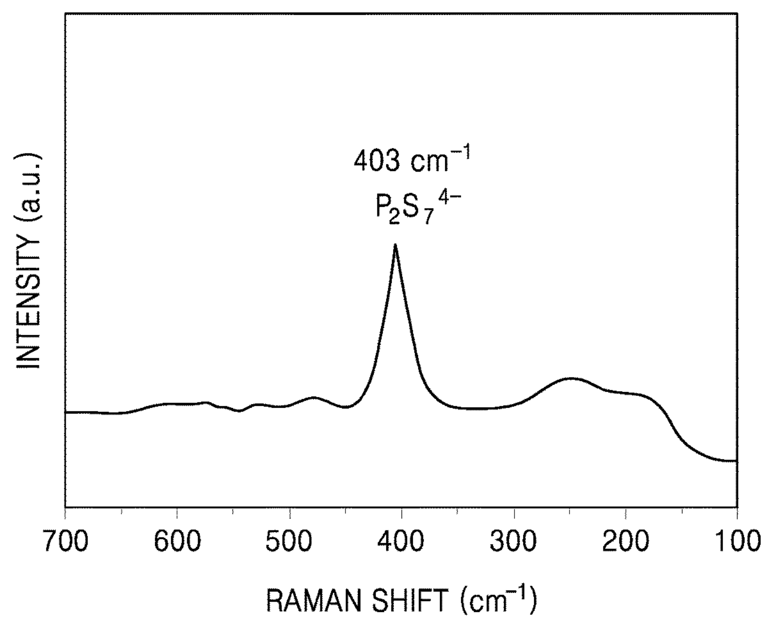
FIG. 2 is a graph of intensity (arbitrary units, a.u.) versus Raman shift (wavenumbers, $cm^{-1}$) showing the Raman spectrum of $Li_4P_2S_7$ prepared in Example 1.

In Example 1, $Li_4P_2S_7$ was used as a solid electrolyte having lithium ion conductivity. $Li_4P_2S_7$ was prepared as follows. 0.439 grams (g) of $Li_2S$ (99.9%, available from Alfa Co., Ltd) and 1.061 g of $P_2S_5$ (99.9%, available from Aldrich), as starting materials, were measured to achieve concentrations of 66.6 mole percent (mol %) and 33.4 mol %, respectively. $Li_2S$ and $P_2S_5$ were added to a 45 milliliter mL zirconium oxide container in an Ar atmosphere, and 7 zirconium oxide beads having a diameter of 10 millimeters (mm) and 10 zirconium oxide beads having a diameter of 3 mm were added thereto. Then, the container was sealed, and a ball-milling treatment (Frich P-7) was performed thereon at a rate of 380 revolutions per minute (rpm) for 40 hours to obtain 1.5 g of $Li_4P_2S_7$. As shown in FIG. 2, the sample thus obtained was subjected to Raman spectroscopy measurement, and it was confirmed that $Li_4P_2S_7$ may be obtained as a peak derived from a $P_2S_7^{4-}$ structure was observed at a wave number of 403 $cm^{-1}$.

Ion Conductivity of $Li_4P_2S_7$

An ion conductivity of $Li_4P_2S_7$ in a solid state was evaluated by measuring electrochemical impedance using a Teflon cell method in a glove box. That is 200 milligrams (mg) of the solid electrolyte ($Li_4P_2S_7$) was pressed for 1 minute with a 4 ton-load to mold the solid electrolyte into a pellet having a diameter of 12 mm. Next, an indium foil having a thickness of 0.1 mm was punched with a diameter of 13 mm and fixed on both surfaces of the electrolyte pellet. Then, the resultant was set on a Teflon cell that may be pressed with a predetermined pressure by a spring. The solid electrolyte may retrieve electrodes at the two surfaces of the Teflon cell through an indium metal plate. Thereafter, the outside of the Teflon cell was coated with a laminate film to form a vacuum pack, and then the electrochemical impedance was measured. An ion conductivity of the $Li_4P_2S_7$ thus obtained was $6.47\times10^{-5}$ S/cm at 25° C.

Dissolution of $Li_4P_2S_7$

A solution of $Li_4P_2S_7$ in THF, as an organic solvent, was compared with solutions of other lithium ion conductive solid electrolytes, such as $Li_3PS_4$ and $Li_4P_2S_6$. The results of the comparison are shown in Table 1.

TABLE 1

| Sulfide solid electrolyte | Solubility in THF |
|---|---|
| $Li_3PS_4$ | x |
| $Li_4P_2S_7$ | ○ |
| $Li_4P_2S_6$ | x |

As shown in Table 1, it was confirmed that almost no solubility in THF was observed with respect to $Li_3PS_4$ and $Li_4P_2S_6$. However, it was confirmed that $Li_4P_2S_7$ is soluble in THF.

Coin Cell Manufacture 5.0 g of sulfur (Sulfax, Tsurumi Chemical Co., Ltd.) modified with a 1% organic component, 0.56 g of PEO having a molecular weight of 3,000,000, and 30 g of zirconium oxide beads having a diameter of 2 mm were measured, added to a plastic container, and stirred therein. 20 g of acetonitrile was added thereto, stirred once again, and then ball-milled at 90 rpm for 12 hours to obtain a yellow viscous slurry. The zirconium oxide beads were removed by using a mesh, and the slurry was applied on a PET film coated with a releasing agent and dried to form a sulfur self-standing sheet. The sheet thus prepared was molded into the same form as a carbon electrode having a shape of a circle with a diameter of 14 mm, and the sulfur sheet was pressed on a surface of the electrode. The resultant was heated to prepare a sulfur/carbon positive electrode. After introducing sulfur to the positive electrode, the PET film was separated from the electrode surface, and the sulfur/carbon electrode introduced with 8 $mg/cm^2$ to 10 $mg/cm^2$ of sulfur was used in the battery test. A Li—Al alloy film (having an Al concentration of 20 vol % based on at total volume of the Li—Al alloy) having a diameter of 15 mm and a thickness of 400 micrometers (μm) was used as a negative electrode, and Celgard #2400 (available from Celgard) was used as a separator. 150 microliters (μL) of a $Li_4P_2S_7$/THF electrolyte solution, wherein a concentration of $Li_4P_2S_7$ was adjusted to have a concentration of 0.08 M, was used as an electrolyte solution. The positive electrode, the negative electrode, the separator, and the electrolyte solution were used to prepare a CR2032-type coin cell sample.

Comparative Example 1

A coin cell sample was prepared in the same manner as in Example 1, except that $Li_4P_2S_7$ was replaced with $LiBF_4$.

Comparative Example 2

A coin cell sample was prepared in the same manner as in Example 1, except that $Li_4P_2S_7$ was replaced with $LiPF_6$.

Comparative Example 3

A coin cell sample was prepared in the same manner as in Example 1, except that $Li_4P_2S_7$ was replaced with lithium bis(trifluoromethanesulfonyl)imide (LiTFSI).

Figure 3:
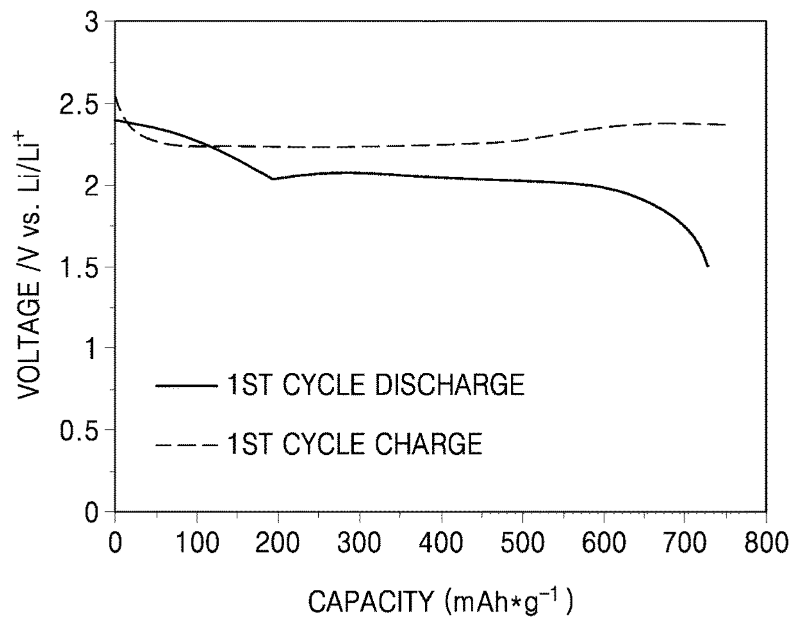
FIG. 3 is a graph of voltage (volts versus $Li/Li^+$) versus capacity (milliampere hours per gram, mAh/g) illustrating charging/discharging profile of a lithium sulfur secondary battery in relation with Example 1.
Figure 4:
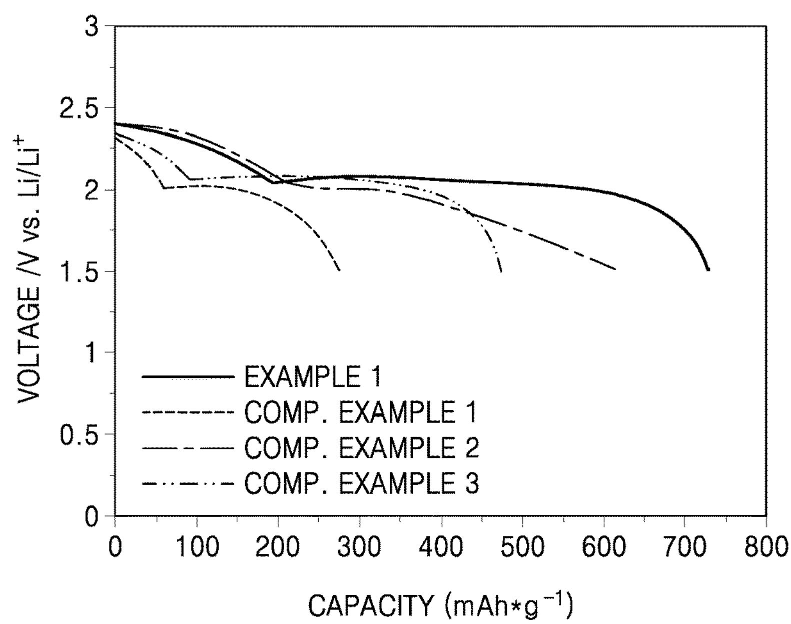
FIG. 4 is a graph of voltage (volts versus $Li/Li^+$) versus capacity (milliampere hours per gram, mAh/g) illustrating the 1st cycle discharging profile of lithium sulfur secondary batteries in relation with Example 1 and Comparative Examples 1 to 3.

Charging/Discharging Characteristics Evaluation of Lithium Sulfur Secondary Battery Lithium sulfur secondary battery characteristics of the coin cell samples prepared in Example 1 and Comparative Examples 1 to 3 were evaluated. The results of the evaluation are shown in FIGS. 3 and 4 and Table 2.

TABLE 2

| | Electrolyte solution | Discharge efficiency at $1^{st}$ cycle [mAh/g] | Resistance value [Ω] | Ion conductivity [mS/cm] |
|---|---|---|---|---|
| Example 1 | $Li_4P_2S_7$/THF | 730 | 1600 | $2.9 \times 10^{-4}$ |
| Comparative Example 1 | $LiBF_4$/THF | 275 | 34000 | $1.4 \times 10^{-5}$ |
| Comparative Example 2 | $LiPF_6$/THF | 617 | 2100 | $2.2 \times 10^{-4}$ |
| Comparative Example 3 | LiTFSI/THF | 475 | 900 | $5.2 \times 10^{-4}$ |

The measurement was performed by charging/discharging the samples with a constant current of 0.77 milliamperes (mA) (0.5 $mA/cm^2$), and a cut-off voltage was 1.5 V during the discharging process and 2.37 V during the charging process.

As shown in FIG. 3, the coin cell sample of Example 1 may be charged/discharged to a charging/discharging capacity over 700 mAh/g.

Also, as shown in FIG. 4 and Table 2, the coin cell samples of Comparative Examples 1 to 3 had a significantly lower capacity, compared to that of the first cycle discharge capacity of the coin cell sample prepared in Example 1. Thus, it was confirmed that a $Li_4P_2S_7$ electrolyte solution in a lithium sulfur secondary battery improves a capacity of a battery.

Ion Conductivity of Electrolyte Solution

Ion conductivities of a $Li_4P_2S_7$/THF electrolyte solution prepared by using the solid electrolyte prepared in Example 1 and Li electrolyte salt/THF electrolyte solutions prepared using the solid electrolyte prepared in Comparative Examples 1 to 3 were measured and compared. About 5 mL of each of the electrolyte solutions controlled to have a concentration of 0.08 M was added to a glass cell including SUS electrode as both the electrodes to measure the ion conductivities through the alternating current impedance method. Also, the ion conductivities were calculated by using a cell constant that was obtained from the same test using a 0.1 normal (N) KCl aqueous solution. The results of the measurement are shown in FIG. 5 and Table 2.

Figure 5:
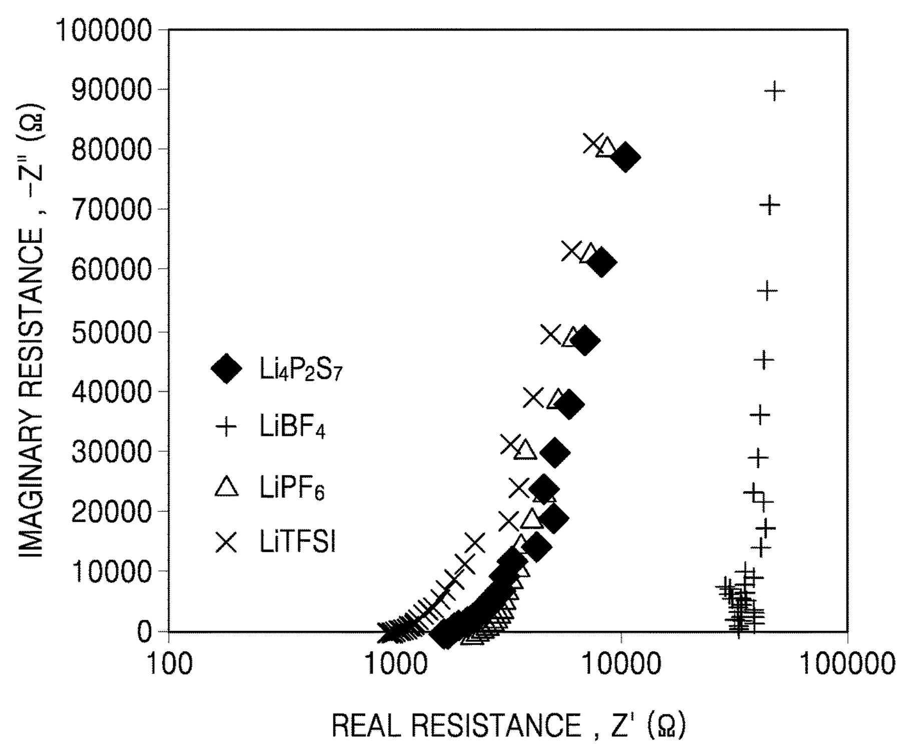
FIG. 5 is a graph of imaginary resistance (Z", ohms) versus real resistance (Z', ohms) illustrating an ion conductivity of electrolytes prepared in Example 1 and Comparative Examples 1 to 3.

As shown in FIG. 5 and Table 2, it was confirmed that the $Li_4P_2S_7$/THF electrolyte solution using the electrolyte of Example 1 has an improved ion conductivity compared to those of the electrolyte solutions including $LiBF_4$ or $LiPF_6$ as prepared in Comparative Examples 1 and 2 and has a lower ion conductivity compared to that of an electrolyte solution including LiTFSI as prepared in Comparative Example 3.

CONCLUSION

As the results, it was confirmed that the $Li_4P_2S_7$/THF electrolyte solution of Example 1 has an ion conductivity similar to that of a lithium salt, which is used as an electrolyte for a lithium ion secondary battery, and at the same time may provide improved battery performance. Although the electrolyte solution including LiTFSI prepared in Comparative Example 3 has an improved ion conductivity compared to that of the $Li_4P_2S_7$/THF electrolyte solution of Example 1, the electrolyte solution has a reduced $1^{st}$ cycle discharged capacity of a lithium sulfur secondary battery, and thus the $Li_4P_2S_7$/THF electrolyte solution of Example 1 may be used as an electrolyte solution for a secondary battery.

Disclosed is an electrolyte solution for a secondary battery and a lithium sulfur secondary battery, wherein the electrolyte solution has an improved combination of lithium ion conductivity and electrochemical stability, and provides improved battery performance.

As described above, according to one or more embodiments of the present disclosure, an electrolyte solution for a secondary battery that has sufficient lithium ion conductivity, high electrochemical stability, and excellent battery performance may be provided. Also, when the electrolyte solution is used, a secondary battery having improved battery performance may be provided.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electrolyte for a secondary battery, the electrolyte comprising:

an organic solvent; and a lithium ion conductive solid electrolyte represented by the formula $$Li_aP_bS_c$$

wherein $3<a<5$, $1<b<3$, and $6<c<8$, and wherein at least a portion of the solid electrolyte is dissolved in the organic solvent.

2. The electrolyte of claim 1, wherein the at least a portion of the solid electrolyte has a composition of the formula $Li_4P_2S_7$.

3. The electrolyte of claim 1, wherein the electrolyte has a lithium ion conductivity of $1\times10^{-6}$ Siemens per centimeter or greater.

4. The electrolyte of claim 1, wherein a concentration of the solid electrolyte dissolved in the organic solvent is 0.005 molar or greater.

5. The electrolyte of claim 1, wherein the solvent comprises at least one selected from an ether and an ester.

6. The electrolyte of claim 1, wherein the solvent comprises at least one selected from tetrahydrofuran, glyme, diglyme, triglyme, tetraglyme, diethyl carbonate, propylene carbonate, γ-butyrolactone, and dioxolane.

7. The electrolyte of claim 1, wherein the electrolyte is in the form of gel.

8. The electrolyte of claim 7, wherein the gel comprises at least one selected from polyethylene oxide, polyacrylonitrile, polyvinylidene fluoride, and polymethyl methacrylate.

9. The electrolyte of claim 1, wherein an electrochemical potential window of the electrolyte is from 0 volts to 3.4 volts with respect to lithium metal.

10. A secondary battery comprising:

a negative electrode comprising a material capable of intercalating and deintercalating lithium ions;

a positive electrode comprising a positive electrode active material;

a separator disposed between the negative electrode and the positive electrode; and an electrolyte disposed between the negative electrode and the positive electrode, wherein the electrolyte comprises an organic solvent, and a lithium ion conductive solid electrolyte represented by the formula $$Li_aP_bS_c$$

wherein $3<a<5$, $1<b<3$, and $6<c<8$, and wherein at least a portion of the solid electrolyte is dissolved in the organic solvent.

11. The secondary battery of claim 10, wherein the organic solvent comprises tetrahydrofuran.

12. The secondary battery of claim 10, wherein the electrolyte further comprises an additive.

13. The secondary battery of claim 12, wherein the additive comprises at least one selected from an inorganic additive and an organic additive.

14. The secondary battery of claim 12, wherein the additive comprises at least one selected from $LiNO_3$, an alkali metal salt comprising halogen, an alkaline earth metal salt comprising halogen, and an ammonium salt comprising halogen.

15. The secondary battery of claim 12, wherein the positive electrode comprises a positive electrode active material, and wherein the positive electrode active material comprises sulfur, a lithium metal oxide, or air.

16. The secondary battery of claim 15, wherein the positive electrode active material comprises sulfur modified with an organic component.

17. The secondary battery of claim 12, wherein an operating potential of the secondary battery is 3.4 volts or less with respect to a lithium metal.

18. The secondary battery of claim 12, wherein the positive electrode comprises an olivine positive electrode active material.

19. The secondary battery of claim 18, wherein the olivine positive electrode active material is represented by Formula 1:

$$Li_xMe_yM_zPO_{4-d}X_d \quad \text{Formula 1}$$

wherein $0.9 \le x \le 1.1$, $0.9 \le y \le 1.1$, $0 \le z \le 0.2$, and $0 \le d \le 0.2$;

Me is at least one selected from Fe, Mn, Ni, and Co;

M is at least one selected from Mg, Ca, Sr, Ba, Ti, Zr, Nb, Mo, W, Zn, Al, and Si; and X is at least one selected from S and F.

20. The secondary battery of claim 18, wherein the olivine positive electrode active material comprises at least one selected from $LiFePO_4$, $LiFe_{1-a}Mn_aPO_4$ wherein $0<a<1$, and $LiMnPO_4$.

* * * * *